(12) United States Patent
Blumenthal et al.

(10) Patent No.: US 11,745,326 B2
(45) Date of Patent: Sep. 5, 2023

(54) BOLT CUTTER

(71) Applicant: Milwaukee Electric Tool Corporation, Brookfield, WI (US)

(72) Inventors: Aaron S. Blumenthal, Wauwatosa, WI (US); Aaron M. Williams, Milwaukee, WI (US); Andrew M. Tuchscherer, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 207 days.

(21) Appl. No.: 16/383,221

(22) Filed: Apr. 12, 2019

(65) Prior Publication Data

US 2019/0299388 A1  Oct. 3, 2019

Related U.S. Application Data

(63) Continuation of application No. PCT/US2019/024913, filed on Mar. 29, 2019.

(60) Provisional application No. 62/650,764, filed on Mar. 30, 2018.

(51) Int. Cl.
  *B26B 17/02* (2006.01)
  *B26B 13/28* (2006.01)
  *B25G 1/06* (2006.01)
  *F16C 11/10* (2006.01)

(52) U.S. Cl.
  CPC ............... *B25G 1/06* (2013.01); *B26B 13/28* (2013.01); *B26B 17/02* (2013.01); *F16C 11/10* (2013.01)

(58) Field of Classification Search
  CPC ......... B26B 13/28; B26B 17/02; B26B 13/26; B25G 1/06; A01G 3/021

USPC ............................................................. 403/83
  See application file for complete search history.

(56) References Cited

U.S. PATENT DOCUMENTS

| | | | | |
|---|---|---|---|---|
| 351,339 | A | | 10/1886 | Pullman |
| 444,635 | A | * | 1/1891 | Helwig ................... B26B 17/02 81/348 |
| 641,118 | A | * | 1/1900 | Kelly ..................... B62K 21/16 403/403 |
| 806,481 | A | * | 12/1905 | Moore .................... B26B 17/02 30/193 |
| 1,851,771 | A | | 3/1932 | Keith |
| 2,382,307 | A | | 8/1945 | Geddes et al. |

(Continued)

FOREIGN PATENT DOCUMENTS

| | | |
|---|---|---|
| AU | 3793995 A | 6/1996 |
| CN | 1481976 | 3/2004 |

(Continued)

OTHER PUBLICATIONS https://roymech.org/Useful_Tables/Keyways/key_strength.html or "Roymech" dated 2013 or earlier (Year: 2013).*

(Continued)

*Primary Examiner* — Jennifer S Matthews
(74) *Attorney, Agent, or Firm* — Reinhart Boerner Van Deuren s.c.

(57) ABSTRACT

A cutter comprises one or more blades, a hinge coupled to the blades, and one or more adjustable handles pivotally coupled to the hinge. When being adjusted, the one or more adjustable handles permit adjusting their positions with respect to the opposing handle without concurrently actuating the blades.

14 Claims, 11 Drawing Sheets

(56) References Cited

U.S. PATENT DOCUMENTS

| | | | | |
|---|---|---|---|---|
| 2,587,586 | A * | 3/1952 | Alfredo | A01G 3/065 |
| | | | | 16/370 |
| 2,685,130 | A | 8/1954 | Tibbetts | |
| 3,340,611 | A | 9/1967 | Lauck | |
| 3,574,938 | A | 4/1971 | Porter | |
| 3,733,626 | A | 5/1973 | Allen | |
| 3,949,473 | A | 4/1976 | Blanc | |
| 4,144,737 | A | 3/1979 | Izraeli | |
| 4,768,258 | A | 9/1988 | Langenstein | |
| 4,929,113 | A * | 5/1990 | Sheu | F16C 11/045 |
| | | | | 403/324 |
| 4,964,216 | A | 10/1990 | Gosselin | |
| 5,014,432 | A | 5/1991 | Putsch et al. | |
| 5,261,303 | A | 11/1993 | Strippgen | |
| 5,404,616 | A | 4/1995 | Carmien | |
| 5,722,171 | A * | 3/1998 | Schmidt | F16C 11/10 |
| | | | | 30/255 |
| 5,862,597 | A | 1/1999 | Juros | |
| 5,933,965 | A | 8/1999 | Linden et al. | |
| RE36,407 | E * | 11/1999 | Rocco | F21V 21/26 |
| | | | | 15/176.1 |
| 5,974,670 | A * | 11/1999 | Hsieh | B25B 7/00 |
| | | | | 30/271 |
| 5,988,027 | A | 11/1999 | Lenox | |
| 6,085,425 | A | 7/2000 | Weber | |
| 6,226,874 | B1 | 5/2001 | Jansson | |
| 6,249,976 | B1 * | 6/2001 | Osame | B26B 13/04 |
| | | | | 30/260 |
| 6,854,365 | B1 | 2/2005 | Petts | |
| 6,883,208 | B1 | 4/2005 | Huang | |
| 7,140,278 | B2 * | 11/2006 | Neumann | B25B 7/00 |
| | | | | 81/316 |
| 7,346,991 | B1 * | 3/2008 | Janson | A01G 3/02 |
| | | | | 30/244 |
| 7,591,604 | B2 * | 9/2009 | Roberts | B25F 5/02 |
| | | | | 403/324 |
| 7,694,387 | B1 | 4/2010 | Huang | |
| 7,717,017 | B2 | 5/2010 | McBride et al. | |
| 7,774,901 | B1 | 8/2010 | Huang | |
| 8,132,308 | B2 | 3/2012 | Foley | |
| 8,307,557 | B1 | 11/2012 | Rodgers | |
| 8,316,549 | B2 * | 11/2012 | Musser | B26B 13/16 |
| | | | | 30/260 |
| 8,479,399 | B2 | 7/2013 | Putsch | |
| 9,089,978 | B2 * | 7/2015 | Carmichael | A01G 3/02 |
| 10,047,789 | B1 * | 8/2018 | Mosby | F16C 11/10 |
| 2002/0073557 | A1 | 6/2002 | Huang | |
| 2002/0078518 | A1 * | 6/2002 | Jiang | B25G 1/04 |
| | | | | 15/111 |
| 2003/0123926 | A1 | 7/2003 | Lin | |
| 2004/0018047 | A1 | 1/2004 | Linden et al. | |
| 2004/0181904 | A1 | 9/2004 | Steltzer et al. | |
| 2005/0193498 | A1 | 9/2005 | Klecker et al. | |
| 2005/0204873 | A1 | 9/2005 | Ana | |
| 2006/0027053 | A1 | 2/2006 | Hsien | |
| 2006/0156554 | A1 | 7/2006 | Lin | |
| 2006/0230886 | A1 * | 10/2006 | Hsien | B25B 7/04 |
| | | | | 81/424 |
| 2007/0262597 | A1 | 11/2007 | Ramos | |
| 2008/0016700 | A1 | 1/2008 | Hernandez et al. | |
| 2008/0085150 | A1 | 4/2008 | Wang | |
| 2008/0110030 | A1 | 5/2008 | Seber et al. | |
| 2009/0199682 | A1 * | 8/2009 | Hanning | B25B 7/00 |
| | | | | 81/9.43 |
| 2009/0241614 | A1 | 10/2009 | Hahn | |
| 2010/0175512 | A1 | 7/2010 | Zhang et al. | |
| 2010/0326248 | A1 | 12/2010 | Owoc | |
| 2011/0000026 | A1 | 1/2011 | Shan | |
| 2012/0067164 | A1 * | 3/2012 | Su | B25G 3/38 |
| | | | | 74/575 |
| 2012/0174417 | A1 | 7/2012 | Huang | |
| 2012/0304473 | A1 * | 12/2012 | Panosian | B26B 17/02 |
| | | | | 30/192 |
| 2013/0047441 | A1 | 2/2013 | Schultes et al. | |
| 2013/0175486 | A1 * | 7/2013 | Stawarski | B66F 15/00 |
| | | | | 254/129 |
| 2013/0185945 | A1 | 7/2013 | Wang | |
| 2013/0205601 | A1 | 8/2013 | Wu | |
| 2017/0165852 | A1 | 6/2017 | Feuerstein et al. | |
| 2018/0056409 | A1 * | 3/2018 | Caglar | B23D 29/026 |
| 2019/0389037 | A1 * | 12/2019 | Wang | B25B 7/14 |

FOREIGN PATENT DOCUMENTS

| | | |
|---|---|---|
| CN | 1644326 A | 7/2005 |
| CN | 201067918 | 6/2008 |
| CN | 201899055 U | 7/2011 |
| CN | 101543988 | 8/2012 |
| CN | 302669543 | 12/2013 |
| CN | 206550893 U | 10/2017 |
| DE | 102005050607 | 6/2006 |
| DE | 202018100626 U1 | 2/2018 |
| EP | 1366865 | 12/2003 |
| EP | 2269441 | 1/2011 |
| EP | 2682233 | 1/2014 |
| FR | 2882676 | 1/2007 |
| GB | 1098292 | 1/1968 |
| GB | 1212429 | 11/1970 |
| GB | 2369794 | 11/2003 |
| TW | 547585 | 8/2003 |
| TW | M277257 | 10/2005 |
| TW | 201102237 | 1/2011 |
| TW | I351344 | 11/2011 |
| WO | WO9505271 | 2/1995 |
| WO | WO2013020335 | 2/2013 |
| WO | WO2015168818 | 11/2015 |

OTHER PUBLICATIONS https://lunyax.files.wordpress.com/2016/01/keys-and-splines.pdf or "Design of keys" dated 2016 or earlier (Year: 2016).*

International Search Report and Written Opinion for International Application No. PCT/US2019/024913, dated Aug. 1, 2019, 10 pages.

"Greenlee HDFBC18 Heavy-Duty Bolt Cutter with Fiberglass Handles, 18-Inch", Amazon.com, (allegedly available as of Jul. 27, 2009), accessed on Jul. 27, 2015 [http://www.amazon.com/Greenlee-HDFBC18-HeavyDutyFiberglassHandles/dp/B00125FAS4/ref=sr_18?s=hi&ie=UTF8&qid=1438028751&sr=1-8&keywo], 4 pages.

"Klein Tools 63336 36-Inch Bolt Cutter—Steel Handles", Amazon.com, (Jul. 18, 2004), accessed on Jul. 27, 2015 [http://www.amazon.com/KleinTools6333636InchCutter/dp/B0002DOJWO], 5 pages.

Johnson, Benjamen, "Knipex Concrete Mesh Cutter", toolmonger.com, (Apr. 8, 2009), Toolmonger, accessed on Jul. 27, 2015 [http://toolmonger.com/2009/04/08/knipexconcretemeshcutter/], 3 pages.

"Kobalt 24-in Bolt Cutter", Lowes.com, (2015), accessed on Jul. 27, 2015 [http://www.lowes.com/pd_4646021687855764_?productId=50069703&pl=1 &Ntt=kobalt+bolt+cutter], 1 page.

"Bolt Cutters", nuplacorp.com, (2015), Nupla Corp, Sun Valley, CA, [http://www.nuplacorp.com/product.php?id=199], 1 page.

"Olympia Tools 39-124 Power Grip Bolt Cutter, 24-Inch", Amazon.com, (Oct. 29, 2013), accessed on Jul. 27, 2015 [http://www.amazon.com/OlympiaTools39124Cutter24Inch/dp/B00GACDKAO/ref=lp_553176_1_ 14?s=powerhandtools&ie=UTF8&qid=1438028067&sr= . . . , 5 pages.

"Ridgid 14223 S24 Bolt Cutter", Amazon.com, (Dec. 27, 2006), accessed on Jul. 27, 2015, [http://www.amazon.com/Ridgid14223S24BoltCutter/dp/B00140X8W2], 6 pages.

"Salisbury Insulated Tool, Bolt Cutters 42" S210590", Salisburyonline.com, (2015), SalisburyOnline, accessed on Jul. 27, 2015, [http://www.salisburyonline.com/p1337salisburyinsulatedtoolboltcutters42s210590.aspx?gclid=Cj0KEQjwrdetBRCJg92s44SB77IBEiQAEIWmVZXi9frd3 . . . , 3 pages.

"TEKTON 3410 24-Inch Bolt Cutter", Amazon.com, (Dec. 5, 2007), accessed on Jul. 27, 2015, [http://www.amazon.com/TEKTON3410241 nch BoltCutter/dp/B000NPT5RG], 8 pages.

(56) References Cited

OTHER PUBLICATIONS

"ToughBuilt TB-BC-01001A 14-Inches ToughBuilt Compact Bolt Cutter", Amazon.com, (Jul. 1, 2011), accessed on Jul. 27, 2015, [http://www.amazon.com/ToughBuiltTBBC01001A14InchesCompactCutter/dp/B00582WQA2/ref=lp_553176_1_18?s=powerhandtools&ie=UTF8&qid=1 . . . ], 5 pages.

"Toughbuilt foldable, compact bolt cutters", Press Release, (Sep. 6, 2010), vol. 36 Issue 9, Lebhar-Friedman Inc., United States, 2 pages.

"Workforce 24 in. Bolt Cutters-9003H", Homedepot.com, (2015), accessed on Jul. 27, 2015, [http://www.homedepot.com/p/Workforce24inBoltCutters9003H/100015010], 2 pages.

"Apex Product Line", apexhandtools.com, (2015), Apex Tool Group, LLC, accessed on Jul. 27, 2015 [http://www.apexhandtools.com/search/search_catalog.cfm], 1 page.

"Bolt Cutter 13mm", tool rental advertisement, (2015), Belmont Hire, Australia, accessed on Jul. 27, 2015, [http://www.belmonthire.com.au/products/cutting/boltcutter13mm/], 5 pages.

"Alti Bolt Cutter 24 inch", cuttingedgetactical.com, (2006), Cutting Edge Tactical, accessed on Jul. 27, 2015, [http://www.cuttingedgetactical.com/altiboltcutter24.aspx], 2 pages.

\* cited by examiner

BOLT CUTTER

CROSS-REFERENCE TO RELATED PATENT APPLICATION

This application is a continuation of International Application No. PCT/US2019/024913, filed Mar. 29, 2019, which claims the benefit of and priority to U.S. Provisional Application No. 62/650,764, filed Mar. 30, 2018, which is incorporated herein by reference in its entirety.

BACKGROUND OF THE INVENTION

The present disclosure relates generally to the field of tools. The present disclosure relates specifically to a cutting tool, such as a bolt cutter, that includes one or more adjustable handles.

Bolt cutters are used for a variety of applications, not the least of which is cutting bolts. Traditionally, bolt cutters have two handles coupled to a cutting head. The handles pivot towards and away from each other in concert with the blades in the cutting head concurrently pivoting.

SUMMARY OF THE INVENTION

This disclosure describes one or more embodiments of a cutter, such as a bolt cutter. In one embodiment a cutter includes a first blade, a second blade, a hinge, a locking button and two handles. The hinge is coupled to the blades and actuates the first and second blades (e.g., towards and away from each other). The hinge includes two links. The first link defines a first aperture having a first set of recesses, and the second link defines a second aperture. The first handle is pivotally coupled to the first link at the first aperture so that a third aperture, defined by the first handle and including a third set of recesses, is aligned with the first axis. The locking button actuates along the aligned apertures (e.g., a first axis aligned with the first and third apertures) and rotates around their shared axis. The locking button includes a set of shoulders that protrude radially away from its center (e.g., away from the first axis). The set of shoulders are sized to be received concurrently within both the first and the third sets of recesses. At least one shoulder of the set of shoulders extends an arcuate distance of at least 20 degrees with respect to the first axis. In specific embodiments the cutter includes a biasing element (e.g., a spring) that biases the locking button along the first axis to a position in which the locking button's shoulders interface both the first and third sets of recesses.

In one embodiment, a cutter includes at least two blades, at least two locking buttons, a hinge, and at least two handles. The locking button actuates along and rotate around distinct axes. The locking buttons define a base surface and a set of shoulders that protrude radially away from the respective axis past the respective base surface. At least one shoulder extends at least 10% further from the respective axis than the respective base surface. The hinge is coupled to and actuates the blades. The hinge includes two links, each of which defines an aperture aligned with one of the locking buttons. Each link's aperture includes recesses that interface with the shoulders of the locking button it shares an axis with. The first handle is pivotally coupled to the first link and defines an aperture centered on an axis of one of the locking buttons. The first handle's aperture includes a third set of recesses that interface with the shoulders of the locking button that the first handle pivots with respect to. The second handle is similarly situated, except with respect to the second locking button and the second link.

In one embodiment a cutter includes two blades, a locking button, a hinge, and two handles. The locking button actuates along and rotates around the first axis. The locking button defines a first base surface and includes shoulders that protrude radially away from the first axis. At least two neighboring shoulders of the shoulders are disposed at least 50 arcuate degrees apart from each other with respect to the first axis. The hinge is coupled to the blades and configured to actuate the blades. The hinge includes a first link that defines a first aperture centered around the first axis. The first aperture includes recesses that interface with the shoulders. The first handle is pivotally coupled to the first link. The first handle defines an aperture centered around the first axis and includes recesses that interface with the shoulders protruding from the first locking button. The second handle is coupled to the second link.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

DETAILED DESCRIPTION

Referring generally to the figures, various embodiments of a bolt cutter and elements thereof are shown. Various embodiments of a bolt cutter discussed herein include one or more handles that are pivotally adjustable with respect to the blades.

In one embodiment, a bolt cutter comprises two blades, a compound hinge coupled to the two blades, and two adjustable handles pivotally coupled to the compound hinge via locking buttons. The position of the handles can be adjusted without actuating the blades. This functionality permits the user to customize the arc that the handles traverse to actuate the blades. This type of adjustment can be useful in cutting environments that are physically crowded so that the standard positioning of the handles may not be easy or possible to use. The locking buttons include protrusions that selectively interface with recess in the handle and the hinge. To adjust the position of the handle, the locking button is moved so the protrusions do not interface with the recesses in the compound hinge. The handle's position is adjusted and the locking button protrusions reengage both the hinge and the handle. The relative size of the protrusions in the locking button is large relative to the body of the locking button, permitting larger tolerances for manufacturing than if the protrusions were smaller.

Figure 1:
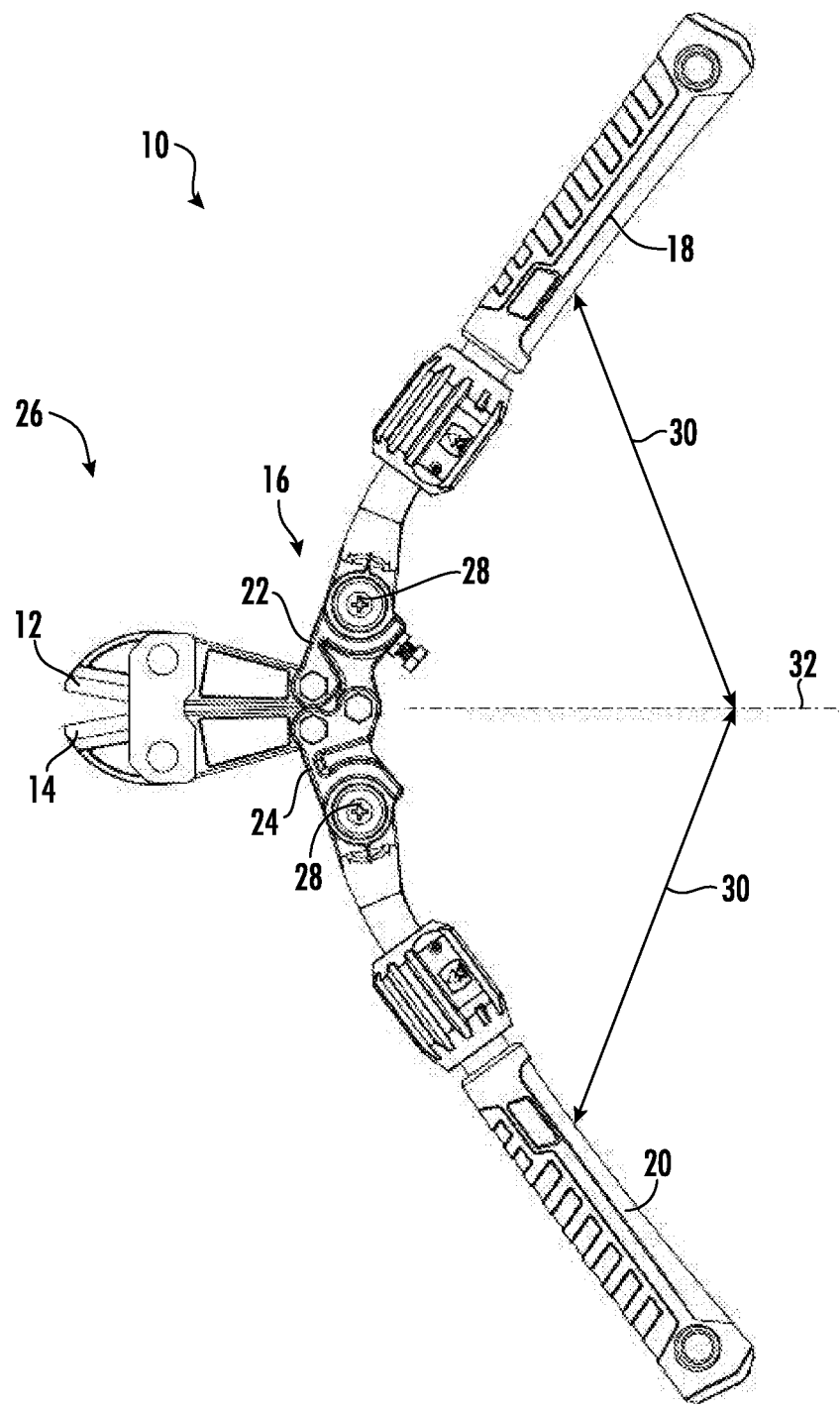
FIG. 1 is a side view of a bolt cutter according to one embodiment with handles in a first position.

FIG. 1 illustrates a cutting tool, shown as a bolt cutter 10 in the illustrated embodiment. Although the cutting tool is described herein as a bolt cutter 10, the tool can be used to cut other objects, such as chain, locks, wood, cable, wire, and the like. Bolt cutter 10 includes first blade 12 and second blade 14 that pivot relative to each other to cut a workpiece. The illustrated embodiment of bolt cutter 10 further includes a hinge, shown as compound hinge 16, handle 18, and handle 20 that are operable to pivot blades 12, 14 to cut the workpiece.

Figure 2:
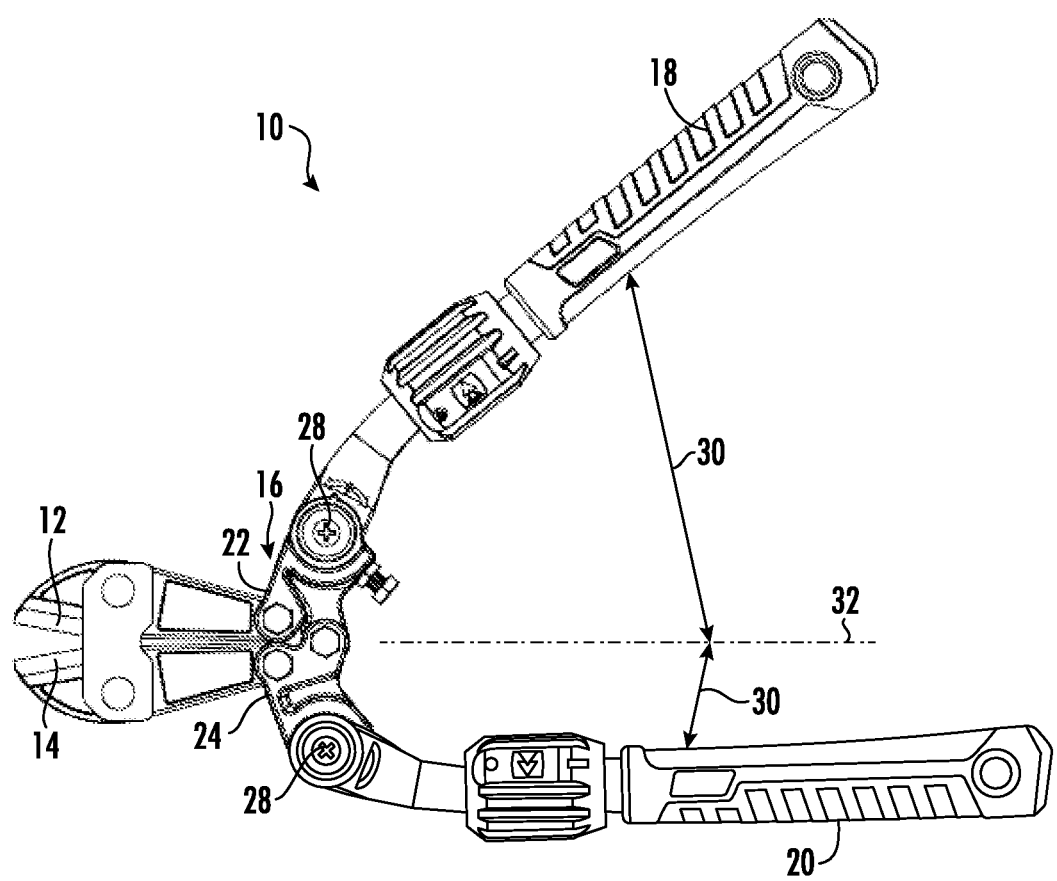
FIG. 2 is a side view of the bolt cutter of FIG. 1 with the handles in a second position, according to an embodiment.
Figure 3:
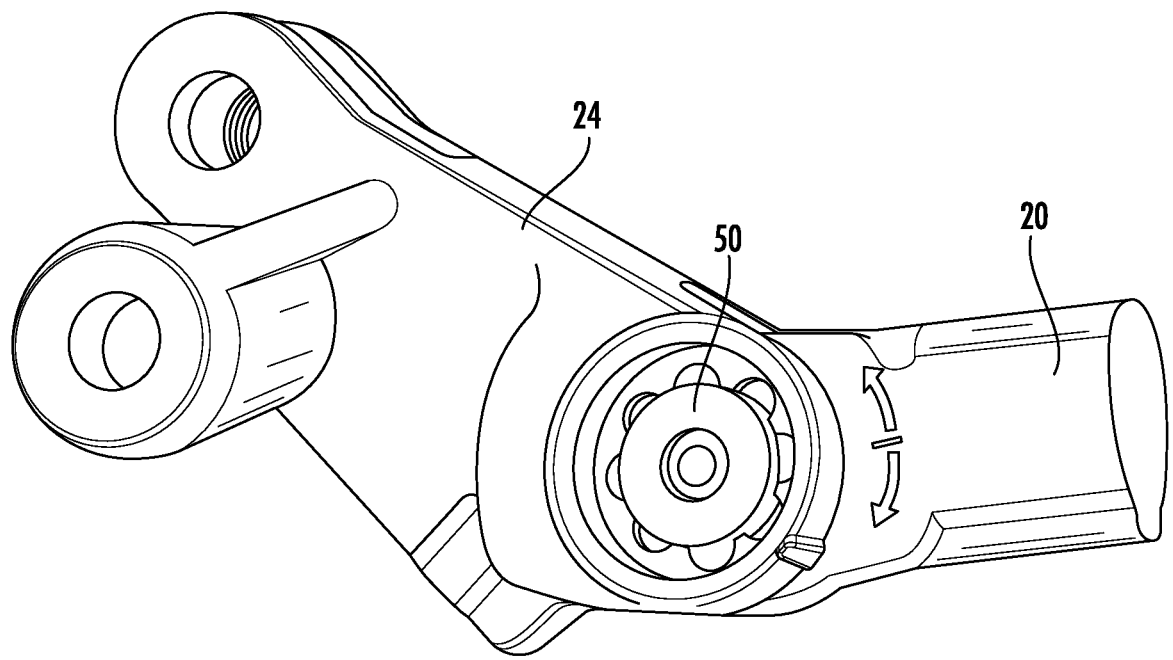
FIG. 3 is a perspective view of a handle adjustment mechanism of the bolt cutter of FIG. 1, according to an embodiment.

Compound hinge 16 includes first link 22 and second link 24. Second link 24 is shown in FIG. 3 along with a portion of handle 20. As will be discussed in more detail below, handle 20 is rotatable about axis 28 relative to link 24 to adjust angle 30 of handle 20 relative to cutting plane 32 (see FIGS. 1 and 2). Angle 30 between cutting plane 32 and handle 18 is similarly adjustable although the angular adjustment will only be described in regard to handle 20 and link 24.

Figure 4:
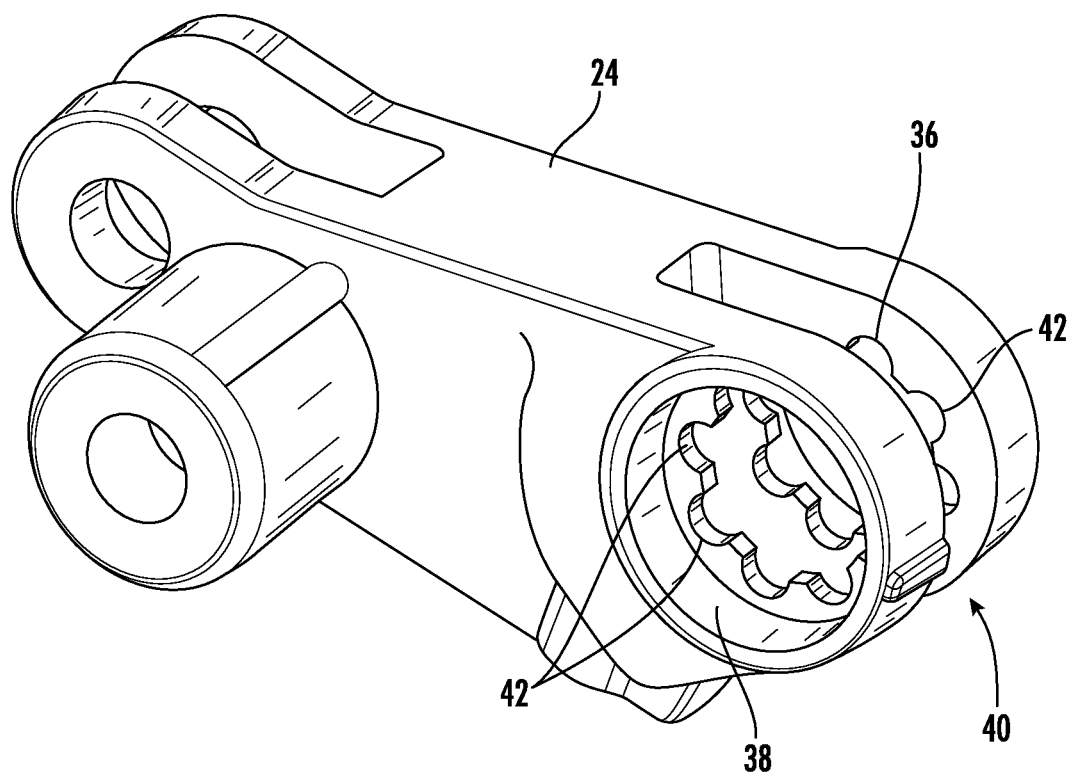
FIG. 4 is a perspective view of a link of the bolt cutter and handle adjustment mechanism of FIG. 3, according to an embodiment.
Figure 5:
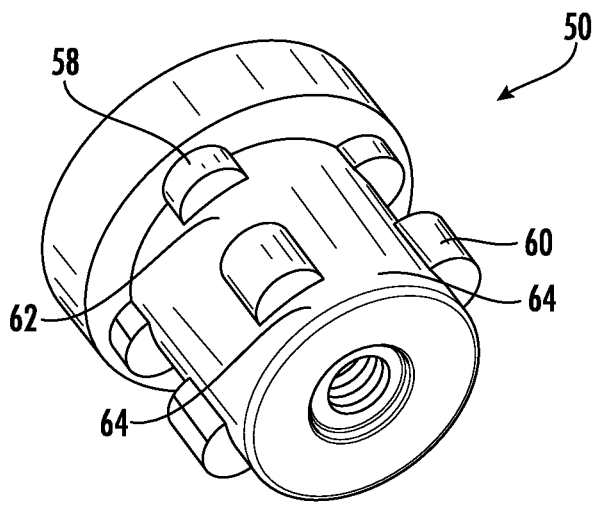
FIG. 5 is a perspective view of a locking button of the handle adjustment mechanism of FIG. 3, according to an embodiment.

Referring to FIG. 4, link 24 includes first aperture 36 and second aperture 38 with gap 40 between apertures 36, 38. Apertures 36, 38 each include recesses 42 that are arcuate shaped and are spaced evenly around the perimeter of apertures 36, 38. In the illustrated embodiment each aperture 36, 38 includes eight recesses 42. In other embodiments, apertures 36, 38 can include fewer or more than eight recesses 42 around the perimeter.

Figure 7:
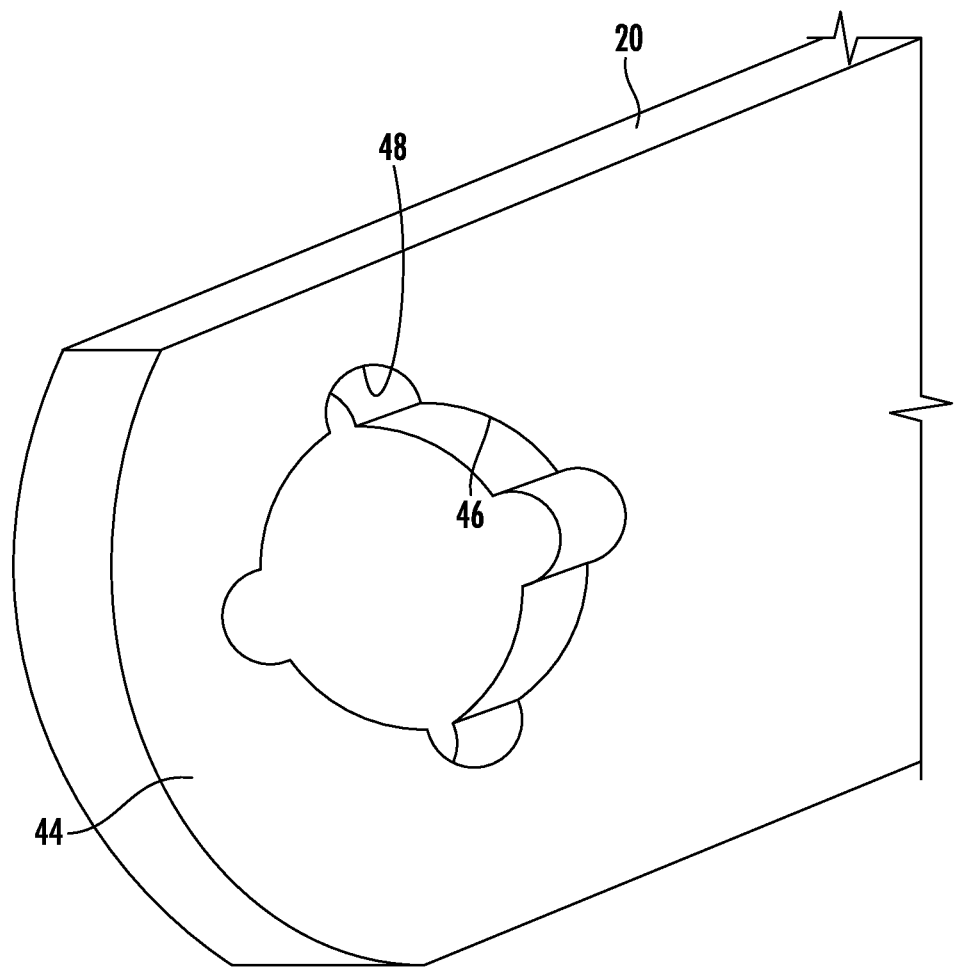
FIG. 7 is a perspective side view of a portion of the handle of FIG. 6, according to an embodiment.
Figure 8:
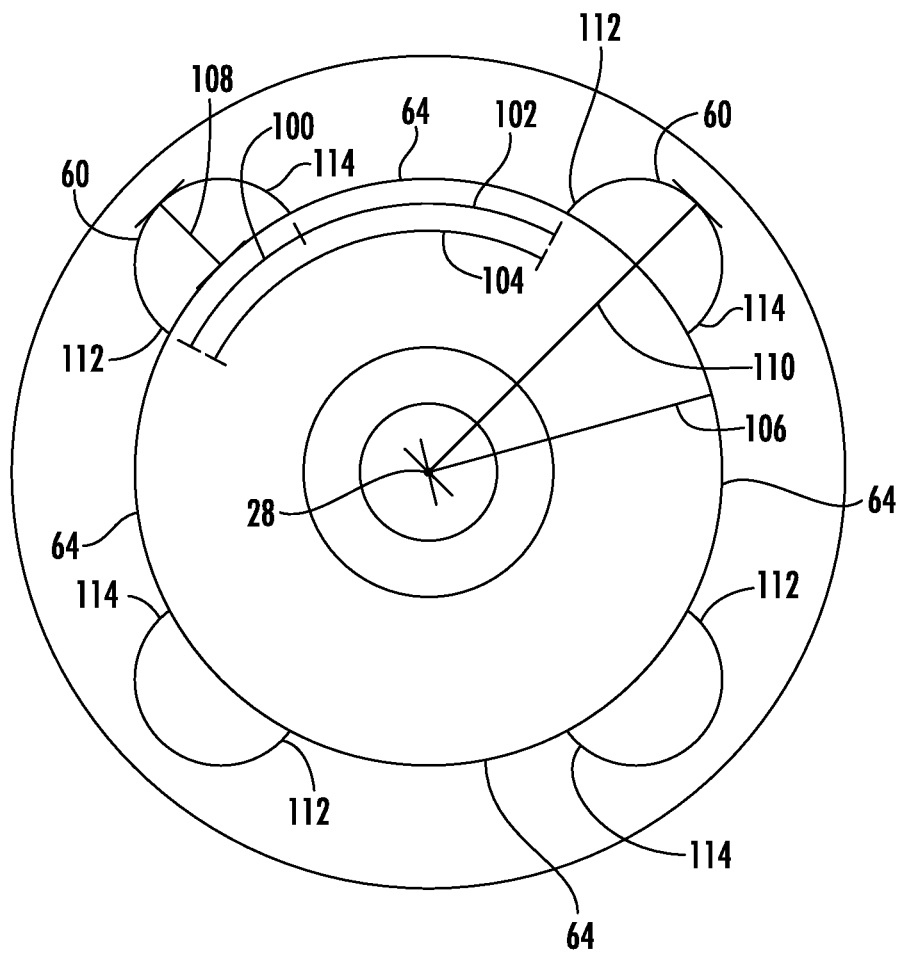
FIG. 8 is a bottom view of a locking button, according to an embodiment.
Figure 9:
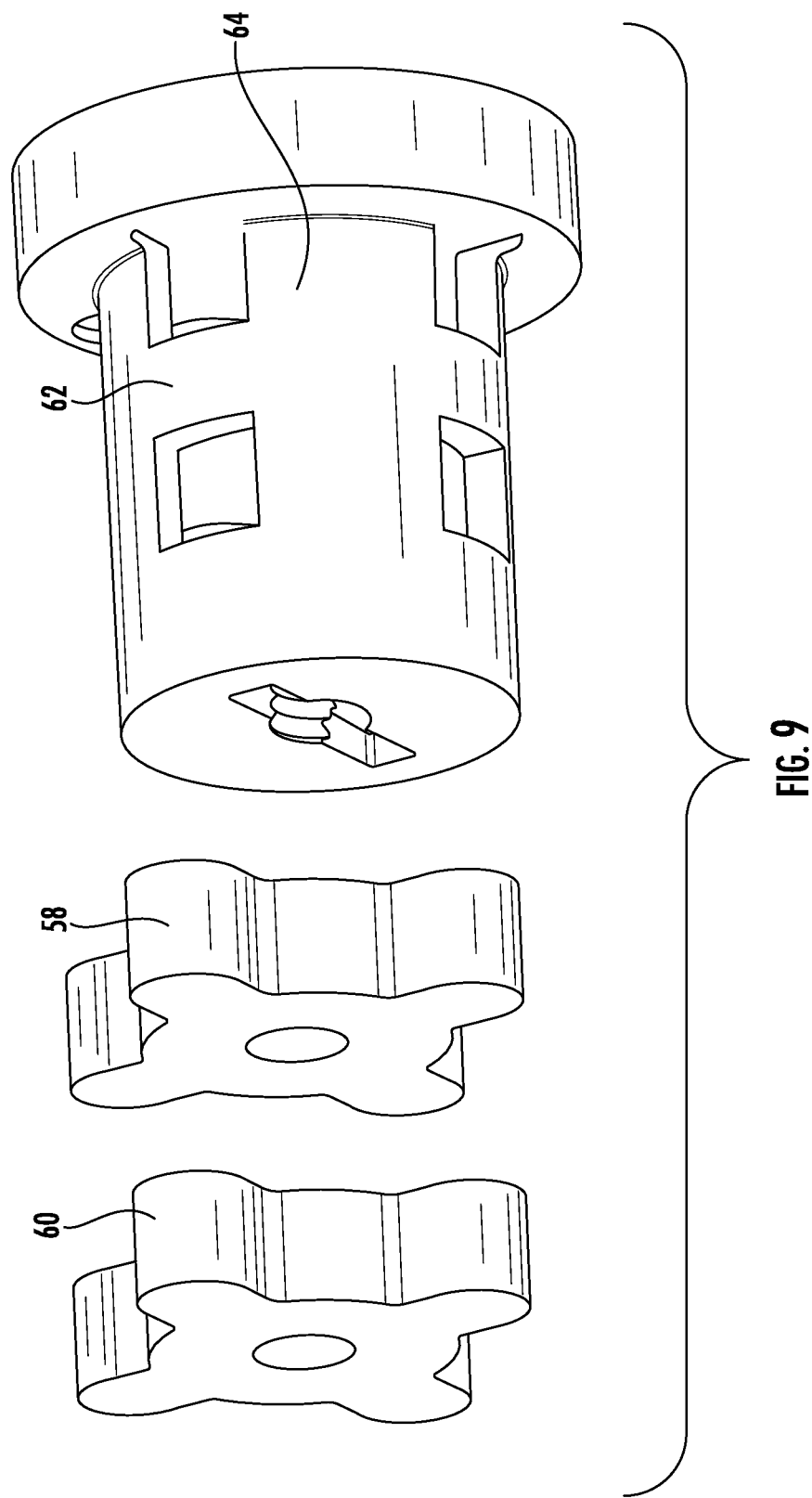
FIG. 9 is an exploded side view of a locking button, according to an embodiment.
Figure 10:
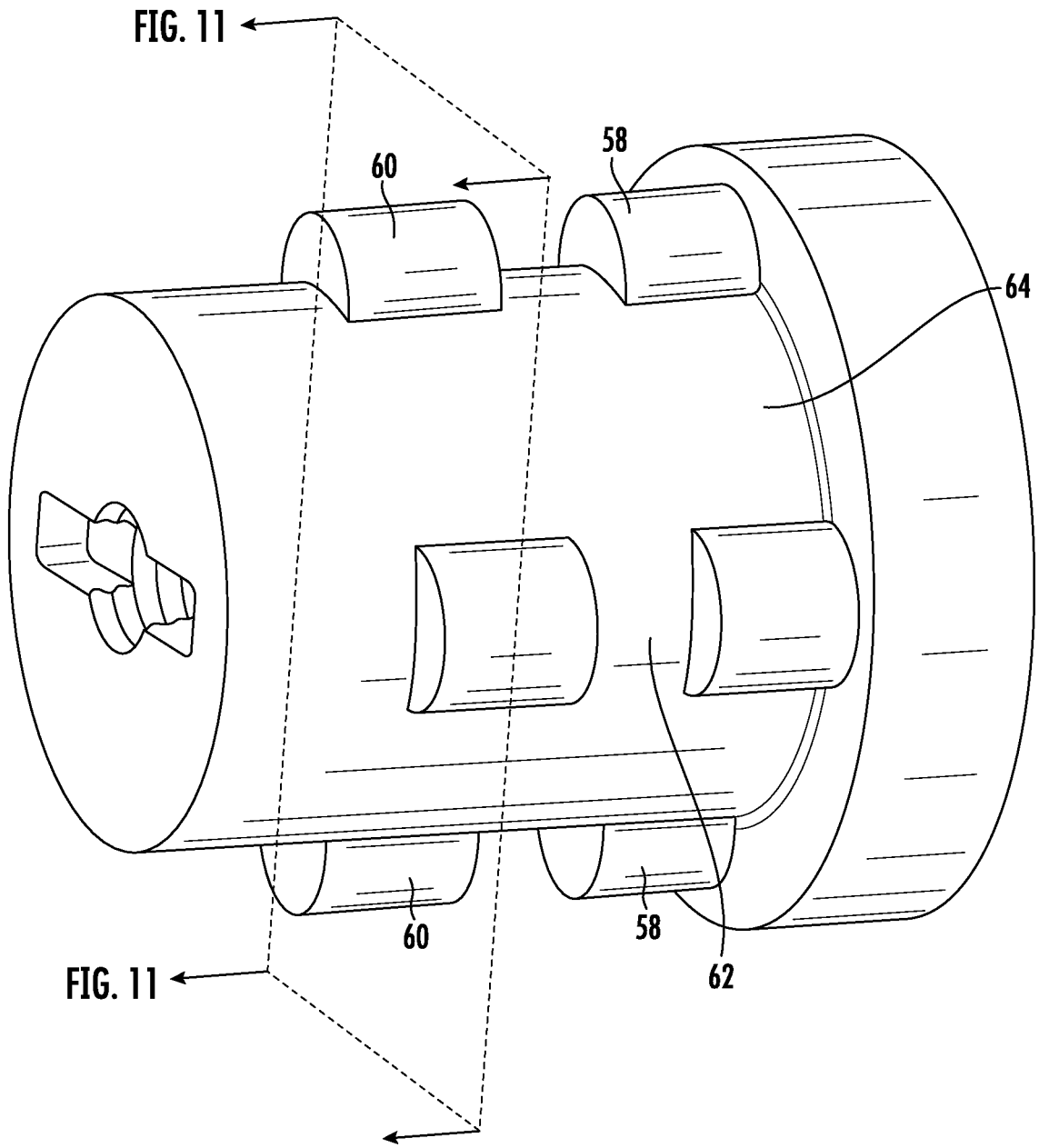
FIG. 10 is a perspective side view of a locking button, according to an embodiment.
Figure 11:
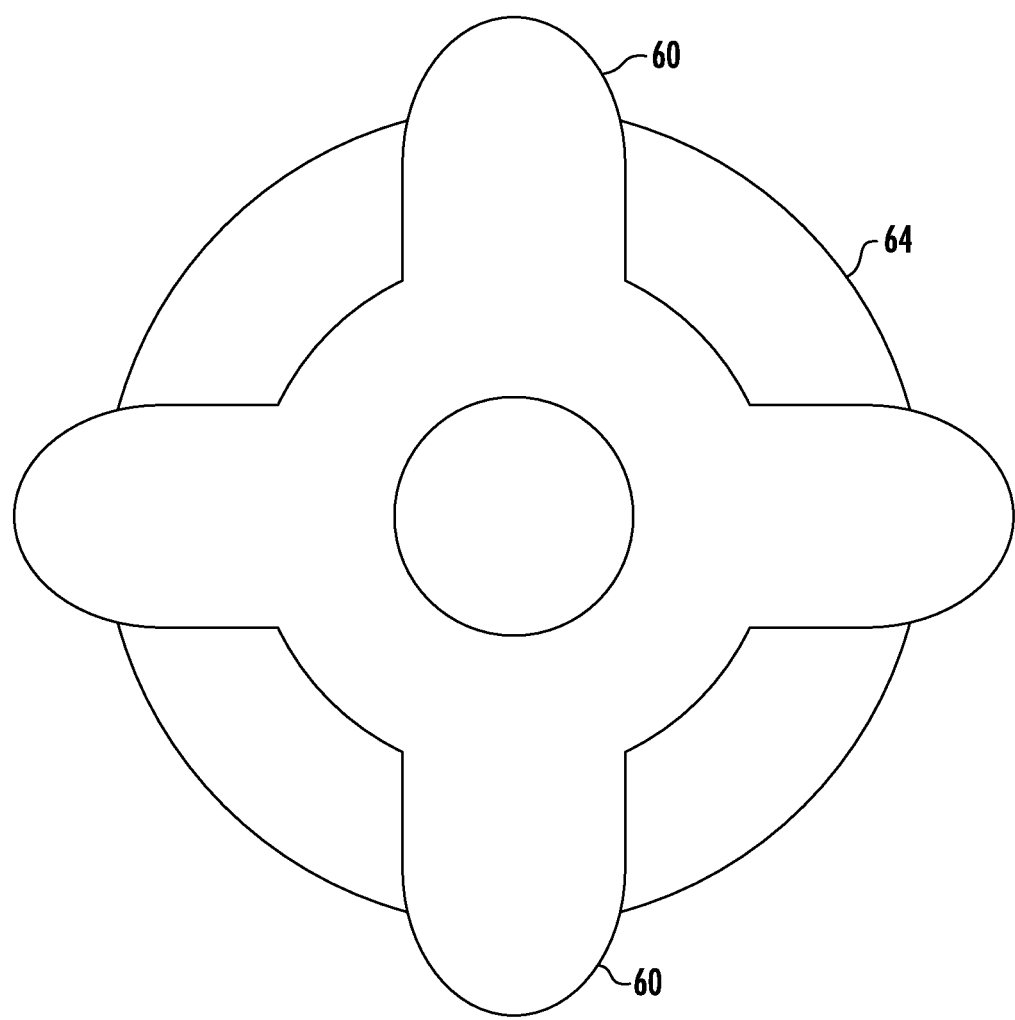
FIG. 11 is a top view of a locking button according to the cross-section defined in FIG. 10, according to an embodiment.

Referring to FIG. 7, handle 20 includes end portion 44 having aperture 46 that extends through end portion 44. End portion 44 is received in gap 40 of link 24 (see FIGS. 3 and 4). With continued reference to FIG. 7, aperture 46 includes recesses 48 that are arcuate shaped and are spaced evenly around the perimeter of aperture 46. Recesses 48 of handle 20 are the same shape as recesses 42 of link 24. In the illustrated embodiment, aperture 46 of handle 20 includes four recesses 48. In other embodiments, aperture 46 can include fewer or more than four recesses 48.

Locking button 50 extends through apertures 36, 38 of link 24 and aperture 46 of handle 20. Locking button 50 locks link 24 and handle 20 together for movement to operate bolt cutter 10 to cut a workpiece. Locking button 50 can be actuated along axis 28 by pushing locking button 50 along pivot axis 52 in direction of arrow 54 (FIG. 6) to allow the user to rotate handle 20 relative to link 24 to adjust angle 30 (see FIGS. 1 and 2). Locking button 50 includes a first set of shoulders 58 and a second set of shoulders 60 spaced from the first set of shoulders 58 by a base surface 62. The shoulders 58, 60 are arcuate shaped and sized to be removably received in the recesses 42 of the link 24 and the recesses 48 of the handle 20. That is, the shoulders 58, 60 can slide into and out of the recesses 42, 48. Shoulders 58, 60 protrude past base surface 64 of locking button 50. Base surface 64 encircles axis 28 between shoulders 58, 60.

Figure 6:
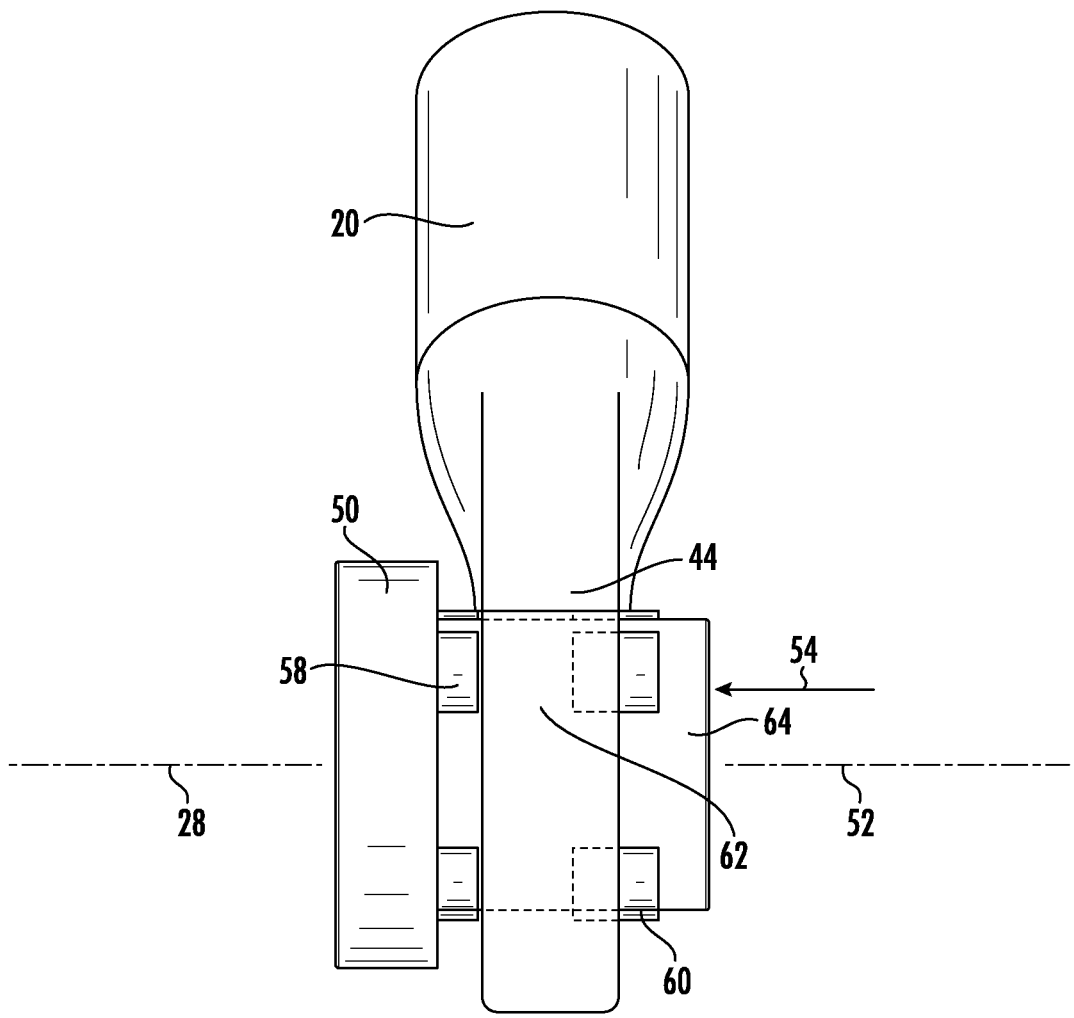
FIG. 6 is an end view of the locking button and a portion of the handle of the bolt cutter with the locking button in a first position, according to an embodiment.

FIG. 6 illustrates locking button 50 in position for cutting operation of bolt cutter 10. In the position of FIG. 6, the first set of shoulders 58 of locking button 50 are received in recesses 42 of second aperture 38 of link 24. Meanwhile, the second set of shoulders 60 are received in both recesses 48 of handle 20 and recesses 42 of first aperture 36 of link 24. This position of locking button 50 couples handle 20 and link 24 for co-rotation to move blades 12, 14 to cut a workpiece. If the user desires to change angle 30 of handles 18, 20 (FIG. 1), the user pushes biasing interface 72 to actuate locking button 50 in the direction of arrow 54 to move locking button 50 along axis 52 relative to link 24 and handle 20. This relative movement causes the first set of shoulders 58 to move out of recesses 42 of second aperture 38 of link 24 thereby causing smooth base surface 62 to be adjacent recesses 42. The movement also causes the second set of shoulders 60 to move out of recesses 42 of first aperture 36 of link 24 and entirely within recesses 48 of handle 20. Therefore, smooth base surface 62 is adjacent recesses 42 of link 24. This position of locking button 50 with respect to link 24 allows the user to rotate handle 20 about axis 28 relative to link 24 to adjust angle 30. When handle 20 is at the desired position, locking button 50 is moved back to the position illustrated in FIG. 6 and described above for cutting operation. First link 22 and handle 18 include a similar arrangement that provides for adjustment of angle 30.

Referring to FIGS. 8-11, depicted therein are exemplary embodiments of locking button 50. Second set of shoulders 60 protrude past base surface 62 away from axis 28. Shoulder 60 extends arc 100 around locking button 50 with respect to axis 28. Neighboring shoulders 60 define an intermediate arc 102 between first edge 112 of a first shoulder 60 and second edge 114 of a second shoulder 60. Neighboring shoulders 60 refer to shoulders that extend over different arcs 100 around locking button 50 defining intermediate arc 102. Neighboring shoulders 60 also define a total arc 104 between first edges 112 of neighboring shoulders 60. Base surface 62 extends distance 106 from axis 28, and shoulder 60 extends distance 108 past base surface 62 and distance 110 from axis 28.

In one embodiment the arc 100 of shoulder 60 is between 20 and 40 degrees with respect to axis 28, and more specifically between 25 and 35 degrees with respect to axis 28, and more specifically between 29 and 33 degrees with respect to axis 28, or even more specifically 31 degrees with respect to axis 28. In various embodiments at least one shoulder of first set of shoulders 58 defines these arcuate distances and ranges, at least one shoulder of second set of shoulders 60 defines these arcuate distances and ranges, each shoulder of first set of shoulders 58 defines these arcuate distances and ranges, each shoulder of second set of shoulders 60 defines these arcuate distances and ranges, and/or each shoulder of first and set of shoulders 58, 60 defines these arcuate distances and ranges.

In one embodiment distance 110 that shoulder 60 extends from axis 28 is 5% to 25% longer than the distance 106 of base surface 62 from axis 28, and more specifically distance 110 is 10% to 20% longer than distance 106, and more specifically distance 110 is 12% to 16% longer than distance 106, and even more specifically distance 110 is 14% longer than distance 106. In various embodiments at least one shoulder of first set of shoulders 58 defines these radial relative distances and ranges, at least one shoulder of second set of shoulders 60 defines these radial relative distances and ranges, each shoulder of first set of shoulders 58 defines these radial relative distances and ranges, each shoulder of second set of shoulders 60 defines these radial relative distances and ranges, and/or each shoulder of first and set of shoulders 58, 60 defines these radial relative distances and ranges.

Figure 12:
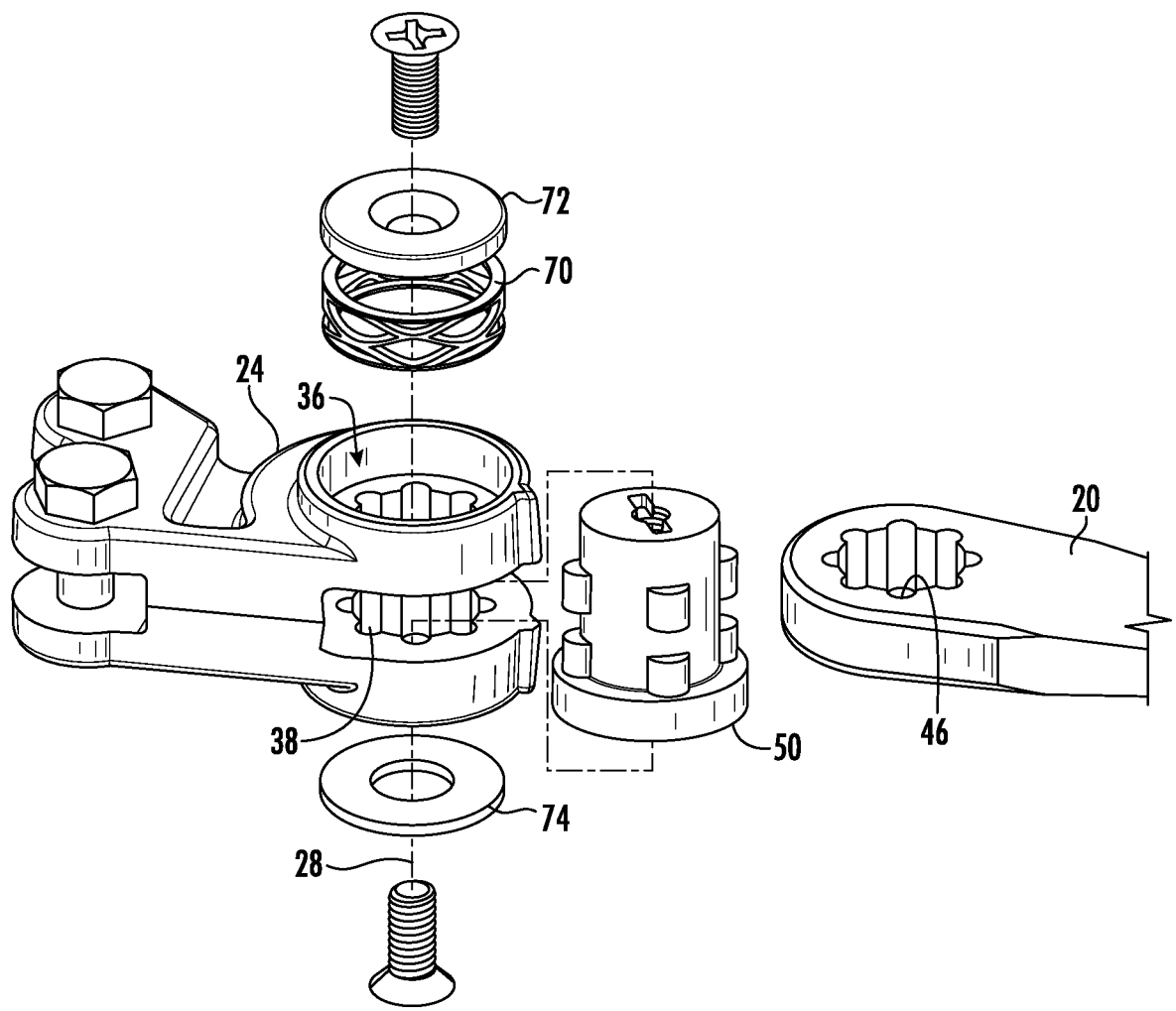
FIG. 12 is an exploded view of a handle adjustment mechanism, according to an embodiment.

Referring to FIG. 12, depicted therein is an exploded view of a locking mechanism according to an embodiment. Locking button 50 is pictured to the right of apertures 36 and 38, but when fully assembled locking button 50 extends through apertures 36 and 38, as indicated by the dotted and dashed line that corresponds to axis 28. When assembled, aperture 46 of handle 20 is disposed between apertures 36, 38 of second link 24. From the perspective of FIG. 12 from top to bottom axis 28, transits fastener, shown as a screw, button interface 72, biasing element 70, shown as a spring, first aperture 36, aperture 46 of handle 20, locking button 50, second aperture 38, washer 74, and another fastener, also shown as a screw.

Figure 13:
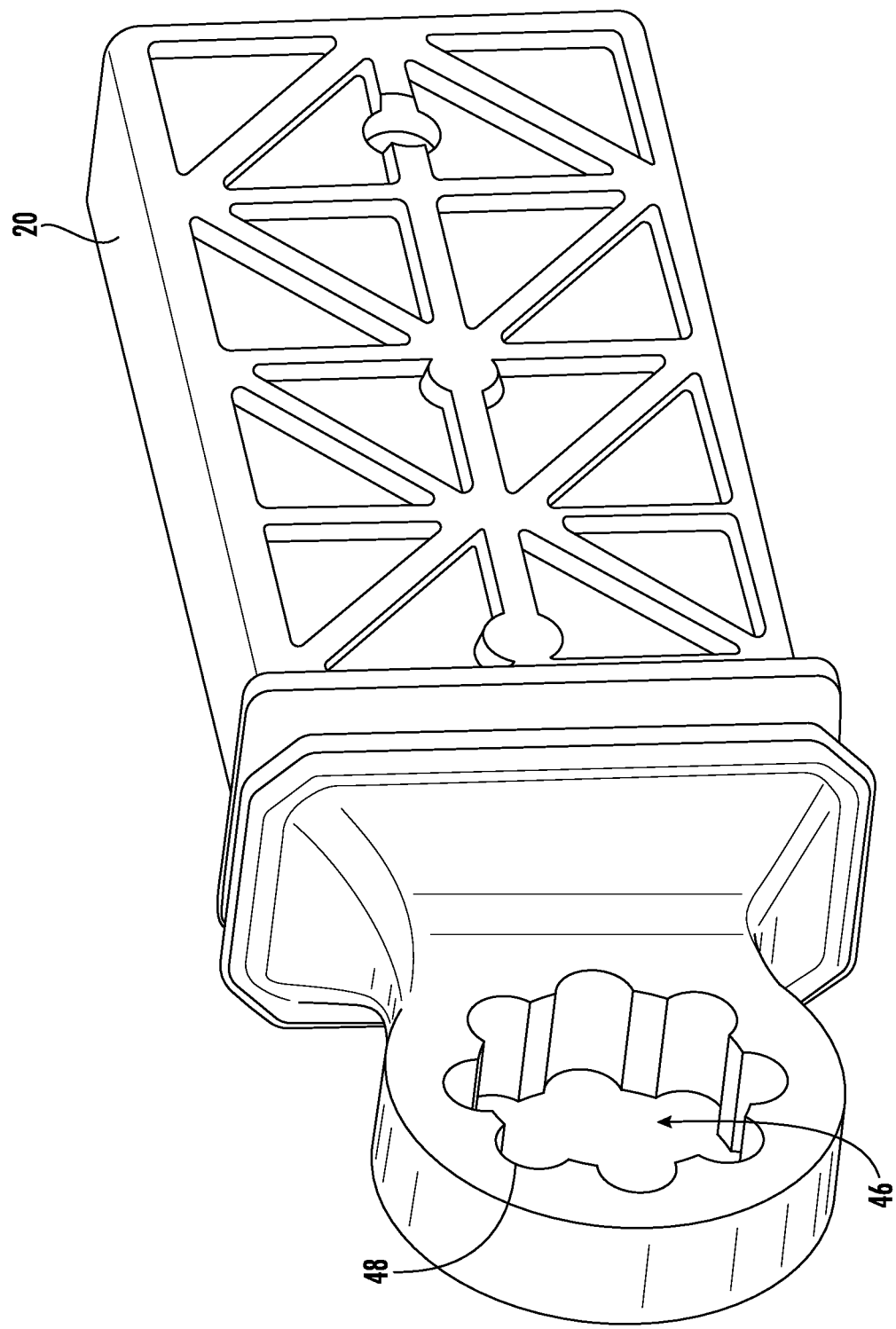
FIG. 13 is a perspective side view of a portion of a handle, according to an embodiment.

Turning to FIG. 13, another embodiment of handle 20 is depicted in which the body of handle 20 defines a rectangular shape. Aperture 46 in FIG. 13 defines eight recesses 48 arranged symmetrically around aperture 46, which is distinct from aperture 46 in FIG. 7 that defines four recesses 48 arranged symmetrically around aperture 46. It is contemplated herein that any number of recesses 48 may be utilized to practice this disclosure, including without limitation 2-10 recesses.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting. It is to be understood that the disclosure is not limited in its application to the details of construction and the arrangement of components set forth in the following description or illustrated in the following drawings. The disclosure is capable of other embodiments and of being practiced or of being carried out in various ways.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

We claim:

1. A bolt cutter comprising:
   a bolt cutting head, the bolt cutting head comprising:
   a first bolt cutting blade;
   a second bolt cutting blade; and
   a compound hinge coupled to the first and second bolt cutting blades such that the first and second bolt cutting blades are allowed to pivot relative to each other, the compound hinge comprising:
      a first link defining a first aperture centered around a first axis, the first aperture comprising a first set of recesses; and
      a second link defining a second aperture centered around a second axis;
   a first adjustable handle pivotally coupled to the first link, the first adjustable handle defining a third aperture centered around the first axis and comprising a third set of recesses;
   a locking button that actuates along the first axis and rotates around the first axis, the locking button comprises a set of shoulders that protrude radially away from the first axis, the set of shoulders sized to be received concurrently within both the first set of recesses and the third set of recesses, at least one shoulder of the set of shoulders having an arcuate radially outermost surface that extends an arcuate distance of at least 20 degrees with respect to the first axis;
   the set of shoulders being less in number than the first set of recesses, and
   a second adjustable handle pivotally coupled to the second link at the second axis.

2. The bolt cutter of claim 1, further comprising a biasing element that biases the locking button in a first direction along the first axis to a position in which the set of shoulders interfaces both the first set of recesses and the third set of recesses.

3. The bolt cutter of claim 1, the locking button configured to actuate along the first axis to a position in which the set of shoulders do not interface the first set of recesses.

4. The cutter of claim 1, wherein the set of shoulders define arcuate surfaces that protrude from the locking button.

5. The cutter of claim 1, wherein the at least one shoulder extends an arcuate distance between 20 degrees and 40 degrees with respect to the first axis.

6. The cutter of claim 1, wherein the at least one shoulder extends an arcuate distance between 25 degrees and 35 degrees with respect to the first axis.

7. The cutter of claim 1, wherein the at least one shoulder extends an arcuate distance between 29 degrees and 33 degrees with respect to the first axis.

8. The cutter of claim 1, wherein each shoulder in the set of shoulders extends an arcuate distance at least 20 degrees with respect to the first axis.

9. The cutter of claim 1, wherein each shoulder in the set of shoulders extends between 20 degrees and 40 degrees with respect to the first axis.

10. The bolt cutter of claim 1, wherein each shoulder of the set of shoulders comprises an arcuate, radially outermost surface.

11. The bolt cutter of claim 10, wherein the locking button further comprises a cylindrical base surface, wherein the set of shoulders protrudes radially outward from the base surface, where in a maximum radius of each shoulder is less than a maximum radius of the locking button.

12. The bolt cutter of claim 11, wherein the cylindrical base surface extends a first distance from the first axis, wherein a shoulder extends a second distance from the first axis defining a third distance, wherein the third distance is the total of the first distance and the second distance.

13. The bolt cutter of claim 1, wherein the set of shoulders is a first set of shoulders and further comprising a set of shoulders, wherein the second set of shoulders is spaced from the first set of shoulders by a base surface, wherein the first set of shoulders comprises exactly four shoulders and the second set of shoulders comprises exactly four shoulders.

14. The bolt cutter of claim 13, wherein the locking button further comprises an inner surface adjacent to the first set of shoulders, wherein the inner surface extends radially outward beyond the first set of shoulders.

* * * * *